US008510306B2

(12) United States Patent
Carmel et al.

(10) Patent No.: US 8,510,306 B2
(45) Date of Patent: Aug. 13, 2013

(54) FACETED SEARCH WITH RELATIONSHIPS BETWEEN CATEGORIES

(75) Inventors: David Carmel, Haifa (IL); Haggai Roitman, Yokne'am Elit (IL); Sivan Yogev, Givat Haim Meuchad (IL)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/118,477

(22) Filed: May 30, 2011

(65) Prior Publication Data

US 2012/0310940 A1 Dec. 6, 2012

(51) Int. Cl.
*G06F 17/30* (2006.01)

(52) U.S. Cl.
USPC ............................ 707/737; 707/740; 707/742

(58) Field of Classification Search
USPC .................. 707/708–715, 736–747, 765–772
See application file for complete search history.

(56) References Cited

U.S. PATENT DOCUMENTS

| 6,976,018 B2 | 12/2005 | Teng et al. |
| 7,873,973 B2 | 1/2011 | Knudson et al. |
| 2006/0235870 A1 | 10/2006 | Musgrove |
| 2008/0133473 A1* | 6/2008 | Broder et al. ..................... 707/3 |
| 2008/0281915 A1* | 11/2008 | Elad et al. ...................... 709/204 |
| 2010/0250497 A1* | 9/2010 | Redlich et al. ................ 707/661 |

OTHER PUBLICATIONS

Ori Ben-Yitzhak et al., "Beyond basic faceted search", WSDM'08, Feb. 11-12, 2008, Palo Alto, California, USA. Copyright 2008 ACM.

* cited by examiner

*Primary Examiner* — Wilson Lee

(57) ABSTRACT

Method, system, and computer program product for faceted search with relationships between categories are provided. The method includes: having a document set of multiple documents, each document having associated categories to which it belongs; grouping multiple categories associated with a document into a category set based on a relationship between the multiple categories; associating the category set with the document; and indexing the category set for retrieval of documents from categories sharing a category set. Wherein indexing the category set includes: having an index entry of a textual representations of a category, wherein the index entry includes a single occurrence for each document to which the category is attached; adding a payload to a document occurrence of a serialization of an identifier of the category sets to which the category belongs associated with the document. Indexing the category set further includes: adding an index entry for category set data, wherein the index entry includes a single occurrence for each document, wherein a document occurrence includes a payload of a serialization of an identifier of category sets associated with the document, and an identifier of the categories belonging to the category sets.

15 Claims, 10 Drawing Sheets

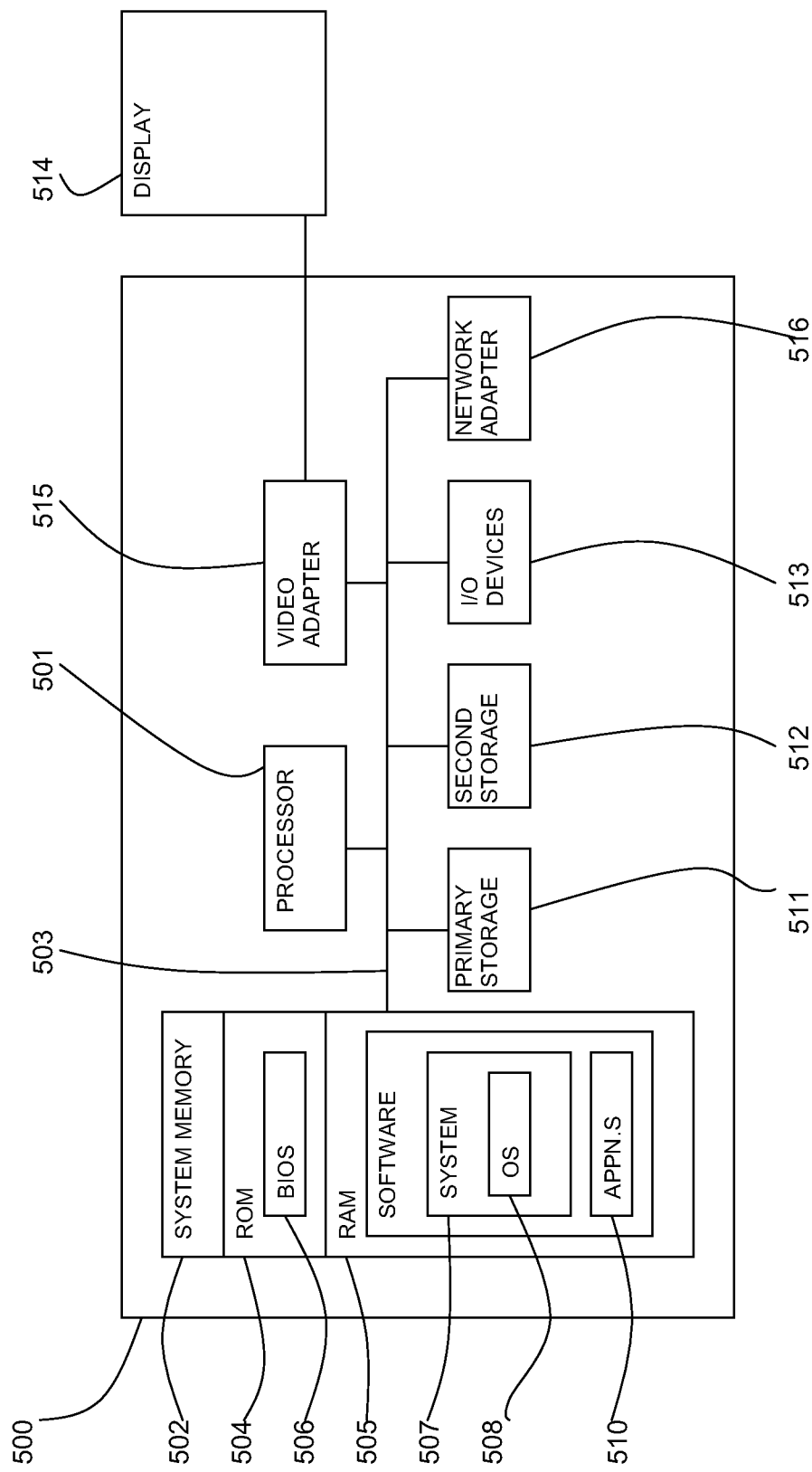

FACETED SEARCH WITH RELATIONSHIPS BETWEEN CATEGORIES

BACKGROUND

This invention relates to the field of faceted search. In particular, the invention relates to faceted search with relationships between categories.

A category is an aspect of indexed documents which can be used to classify the documents. For example, in a collection of books at an online bookstore, categories of a book can be its price, author, publication date, binding type, and so on.

In faceted search, in addition to the standard set of search results, facet results are also provided, which are lists of subcategories for certain categories. For example, for the price facet, a list of relevant price ranges is provided; for the author facet, a list of relevant authors is provided; and so on. In most user interfaces, when users click one of these subcategories, the search is narrowed, or drilled down, and a new search limited to this subcategory (e.g., to a specific price range or author) is performed.

One of the weaknesses of current faceted search systems is an inability to capture more complex data. For example, if different books in a bookstore have different bindings and prices, currently, modeling the store inventory in faceted search will result in different facets about every binding and price. However, not all books are available in all bindings and prices, and there is no way to capture complex facts such as "There are 10 copies from book X in paperback and price Y". When a buyer wants to buy a copy of book X, the faceted navigation would offer facets about all available bindings and prices for that book. However, when selecting a certain binding, the price facet would not reflect the prices available for all bindings, rather the prices available for the binding selected. This does not provide the user with the requested information.

BRIEF SUMMARY

According to a first aspect of the present invention there is provided a computer-implemented method for faceted search with relationships between categories performed by a computerized device, comprising: having a document set of multiple documents, each document having associated categories to which it belongs; grouping multiple categories associated with a document into a category set based on a relationship between the multiple categories; associating the category set with the document; and indexing the category set for retrieval of documents from categories sharing a category set.

According to a second aspect of the present invention there is provided a computer program product for faceted search with relationships between categories, the computer program product comprising: a computer readable non-transitory storage medium having computer readable program code embodied therewith, the computer readable program code comprising: computer readable program code configured to: have a document set of multiple documents, each document having associated categories to which it belongs; group multiple categories associated with a document into a category set based on a relationship between the multiple categories; associate the category set with the document; and index the category set for retrieval of documents from categories sharing a category set.

According to a third aspect of the present invention there is provided a system for faceted search with relationships between categories, comprising: a processor; an index of a document set of multiple documents; an indexing system including: a category associating component for associating categories to a document to which it belongs; a category set component for grouping multiple categories associated with a document into a category set based on a relationship between the multiple categories; a category set associating component for associating the category set with the document; and an indexing component for indexing the category set for retrieval of documents from categories sharing a category set.

According to a fourth aspect of the present invention there is provided a method of providing a service to a customer over a network, the service comprising: having a document set of multiple documents, each document having associated categories to which it belongs; grouping multiple categories associated with a document into a category set based on a relationship between the multiple categories; associating the category set with the document; and indexing the category set for retrieval of documents from categories sharing a category set.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 5 is a block diagram of a computer system in which the present invention may be implemented;

Figure 1:
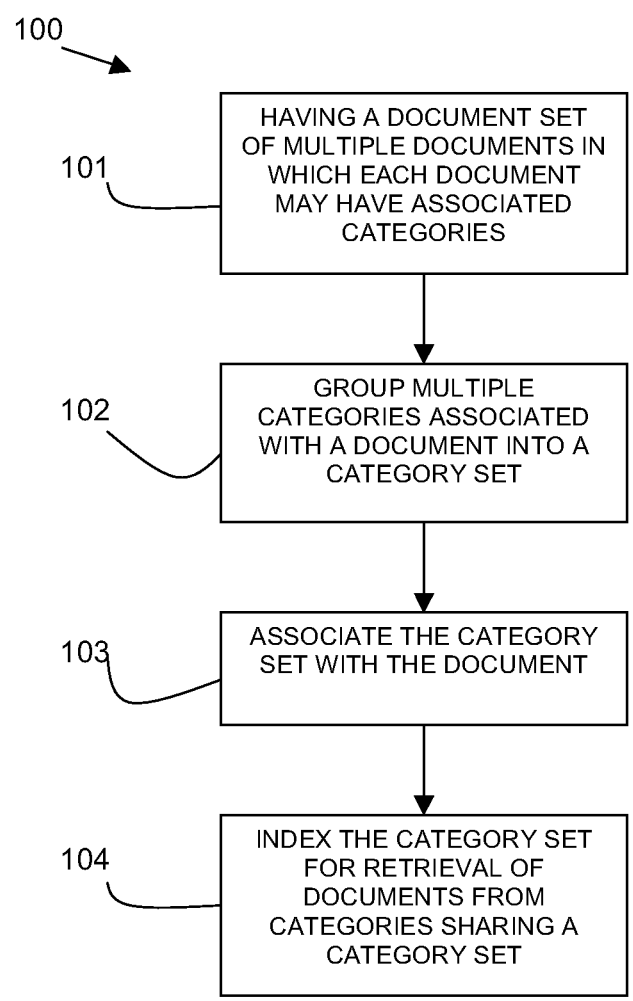
FIG. 1 is a flow diagram of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system and computer program product are described which provide an ability to tie categories attached to a certain document together as a set of related categories. This enables facet counting which applies limitations using these relations. Furthermore, efficient ways to index and retrieve the category sets information are described.

The described solution groups different related categories/facets associated with a document into a category set and associates the category set with the document. The solution also includes indexing the category sets and retrieving documents matching the category set. Multiple simple categories are grouped into a category set and then results provided corresponding to the category set. The term category is used and is intended to include facets, groups, or other forms of related documents.

The following contains a description of a simple implementation of faceted search for background purposes, and the proposed extensions to allow efficient faceted search based on category sets. As the proposed extensions affect only the selection of categories aggregated for each document, other faceted search features should not be affected.

Background: Current Faceted Search Implementation

Let D be a collection of documents $d_1 \ldots d_N$, where document $d_i$ contains words $w_{i,1} \ldots w_{i,ni}$. An inverted index of D generally includes two components:
1. Lexicon: a list of all the words w appearing in D, ordered lexicographically;
2. Posting lists: for each word w, a list of occurrence of w in D. Each entry in the list may be a tuple (i, p, b), where i is the document number, p is the position of the word within the document, and b is a byte array which may contain additional data regarding the occurrence.

A single word search query q(w) may be performed using an inverted index by locating w in the lexicon, and then iterating through its posting list, counting for each document the number of occurrences and ranking the documents by the number of occurrences. A search query for an AND of two words $q(AND(w_1,w_2))$ may be done by finding $w_1$, $w_2$ in the lexicon, and then going through their posting lists and finding documents in which both words appear, ranking these documents by the sum of occurrences of the two words in the documents. More sophisticated queries and scoring may be applied using similar approach.

A taxonomy of categories T may contains nodes $t_0 \ldots t_m$, where $t_0$ is the root of the taxonomy, and each node $t_i$ except for the root ($i \geq 1$) contains a string $s(t_i)$ and has a single direct parent $p(t_i)$. The ordinal of node $t_i$ is i.

Category $c_i$ may be defined as $(t_a{}^1, t_a{}^2, \ldots, t_a{}^k)$ where:

$$t_a{}^k = t_i$$

$$t_a{}^j = p(t_a{}^{j+1}) \text{ for } 1 \leq j \leq k \text{ and}$$

$$p(t_a{}^1) = t_0$$

which is the ordered list of nodes from the root (not including) to $t_i$. The ordinal of $c_i$ is i.

Category $C_a$ is an ancestor of category $c_b$ ($c_a = A(c_b)$), if $c_a$ is a non-empty prefix of $c_b$. The descendants of $c_a$, $\text{Desc}(c_a)$ is the group of categories $c_d$ such that $c_a$ is a prefix of $c_d$.

A collection of documents $D = d_1 \ldots d_n$ may be categorized by attaching to each document $d_i$ multiple categories $C_i = C_i{}^1 \ldots c_i{}^p$. Adding these categories to an inverted index of D may be done as follows.

1. Each category $c_i$ may be assigned a unique textual representation $w(c_i)$ (unique both between categories and in relation to other words in the lexicon). $w(c_i)$ may be added to the lexicon, and its posting list contains a single occurrence in position 0 for each document to which $c_i$ is attached to.

2. A unique word w(T) may be added to the lexicon representing a taxonomy of categories. The posting list of w(T) may contain a single occurrence for each document that has categories. The occurrence related to document $d_i$ may be located in position 0, and its byte array may contain a serialization of the ordinals of the categories in $C_i$.

Let R(q,D) be all documents complying with query q on the collection D. The category count of category c in relation to q (CC(c, q, D)) is the number of documents in R(q,D) to which c is attached. Obtaining all category counts for q may be achieved by going through the posting list of w(T), locating the occurrences in documents from R(q), and de-serializing the byte array of the occurrence. Now, for each category $c_k$ in the de-serialized list, the count of $c_k$ is increased by 1.

Let c be a category in T, and let s be a boolean function such that s(c) selects a sub group of Desc(c). Given a collection D and a query q, let C'(D, q, c, s) be the list of categories $c^1 \ldots c^K$ such that:

$$CC(c^i, q, D) > 0 \text{ for } 1 \leq i \leq K,$$

$$c^i \in s(c) \text{ for } 1 \leq i \leq K,$$

$$CC(c^i, q, D) \geq CC(c^{I+1}, q, D) \text{ for } 1 \leq i \leq K-1.$$

A facet may be defined Facet(D, q, c, s, k) to be the first k elements in C'(D, q, c, s).

Given a query q and a category $c_q$, the Drill Down Query of q and $c_q$ ($DD(q, c_q)$), is a query which limits the results of q to contain only the results to which c is attached. It may be applied by going through the documents in R(q), keeping only documents which occur in the posting list of w(c). Facet calculation for drill down queries may be done the same as for any query.

A drill down query may be generalized from a single category to multiple categories by replacing $c_q$ with a group of categories $C_q$. In that case, only documents in R(q) to which all categories in $C_q$ are attached will be in $DD(q, C_q)$.

Enhancing Faceted Search with Category Sets

A category set $S_i{}^j$ is defined for document $d_i$ as a grouping of categories $c^1 \ldots c^k$ such that $c^l \in C_i$ for $1 \leq l \leq k$. The category sets data may be added in two different ways to the index:

1. Let $S_i^{j1} \ldots S_i^{jp}$ be the category sets of document $d_i$ to which category $c^i$ belongs. As previously defined, the posting list of $w(c^i)$ may include a single occurrence in document $d_i$, at position 0. The byte array of this occurrence may now contain a serialization of $j_1 \ldots j_p$.

2. A unique word CS(T) may be added to the lexicon representing category set listings. The posting list of CS may contain a single occurrence for each document that has category sets with categories from taxonomy T. Assuming $d_i$ has m category sets, the occurrence related to document $d_i$ may be located in position 0, and its byte array may contain a serialization of the category sets $S_i^1 \ldots s_i^m$. This serialization allows, given a category set $S_i^j$, to efficiently retrieve the ordinals of all categories in $S_i^j$.

As defined above, given a query q and a category $c_q$, $R(DD(q, c_q))$ is the set of documents complying with the drill down query of q and $c_q$. The Category Count with Same Set Constraint of c in relation to q and $c_q$ ($CC_{SSC}(c, q, cq, D)$), is the number of documents in $R(DD(q, c_q))$ to which c is attached, such that c and $c_q$ share at least one category set.

An efficient calculation of $CC_{SSC}$ for all categories given certain q and $c_q$ may be done by going through the posting list of $c_q$. For each document $d_i$ in that posting list which is in $R(DD(q, c_q))$, the byte array of the category sets to which $c_q$ belongs may be extracted and de-serialized. For each set $S_i^j$ in the list, the ordinals of all categories in $S_i^j$ may be fetched, and the ordinals from all the lists may be merged to produce the list of categories which comply with the same set constraint in document $d_i$. For each such category $c_k$ the category count may be increased by 1.

Let c be a category in T, and let s be a boolean function such that s(c) selects a sub group of Desc(c). Given a collection D, a query q and a category $c_q$, let $C'_{SSC}(D, q, c, cq, s)$ be the list of categories $c^1 \ldots c^K$ such that:

$$CC_{SSC}(c^i, q, c_q, D) > 0 \text{ for } 1 \leq i \leq K,$$

$$c^i \in s(c) \text{ for } 1 \leq i \leq K,$$

$$CC_{SSC}(c^i, q, c_q, D) \geq CC_{SSC}(c^{i+1}, q, c_q, D) \text{ for } 1 \leq i \leq K-1,$$

A same set constrained facet may be defined $Facet_{SSC}(D, q, c, c_q, s, k)$ to be the first k elements in $C'_{SSC}(D, q, c, c_q, s)$.

The same set constraint may be generalized from a single category constraint to multiple category constraint by replacing $c_q$ with a group of categories $C_q$. Given the generalization drill down query given above, $CC_{SSC}(c, q, C_q, D))$ is the number of documents in $R(DD(q, C_q))$ to which c is attached, such that c and all categories from $C_q$ share at least one category set.

Referring to FIG. 1, a flow diagram 100 shows an embodiment of the described method. The method starts with having 101 a document set of multiple documents in which each document may have associated categories to which it belongs and a reference to which may be attached to the document. The method groups 102 multiple categories associated with a document into a category set which may be based on a relationship between the multiple categories. The category set is associated 103 with the document and indexed 104 for retrieval of documents from categories sharing a category set.

Figure 2:
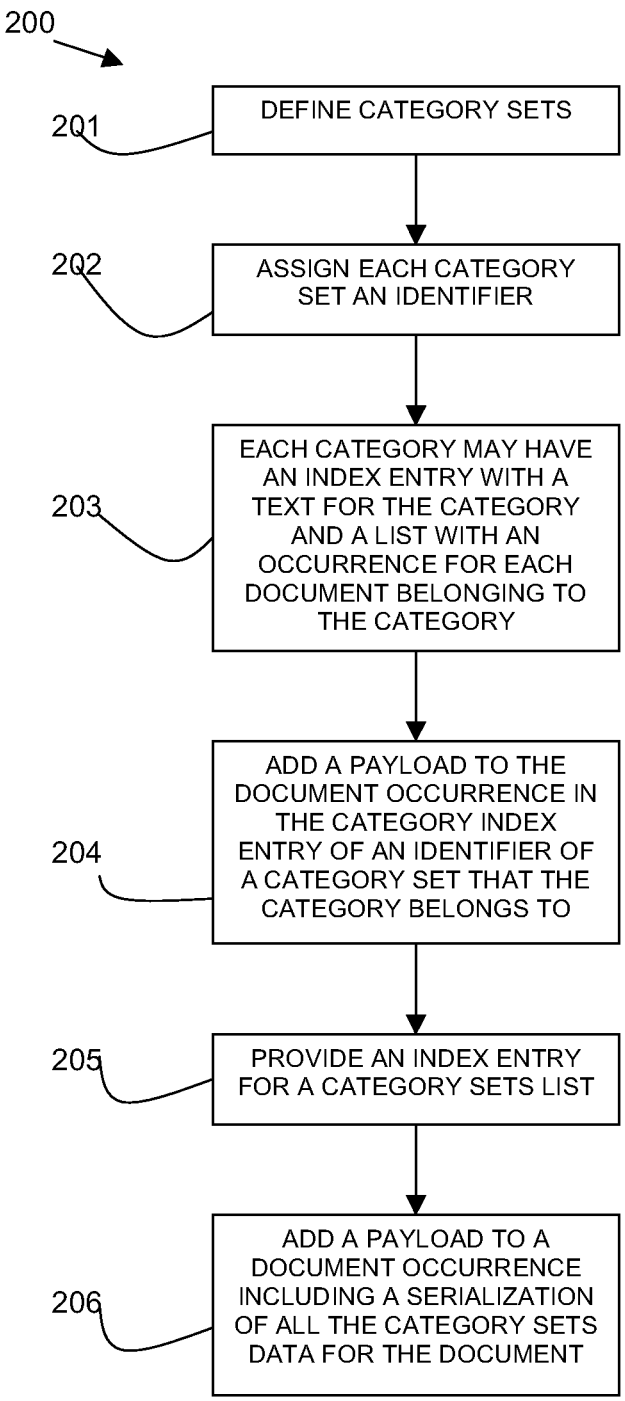
FIG. 2 is a flow diagram of an aspect of a method in accordance with the present invention.

FIG. 2 is a flow diagram 200 showing an example embodiment of a method of indexing the described category sets. Category sets are defined 201 and each defined category set may be assigned 202 an identifier, such as an ordinal number (for example, in ascending order).

Each category may have an existing index entry 203 (for example, in a lexicon) with a unique textual representation of the category and a posting list with an occurrence for each document belonging to the category. A payload may be added 204 to the document occurrence of a category index entry of each category from a category set, with the payload including the set's identifier. If the category belongs to more than one set, the payload may include the identifiers of all the sets the category belongs to.

An index entry may be provided 205 for a category sets list with a posting list with an occurrence for each document that has category sets. A payload may be added 206 to the document occurrence including a serialization of all the category sets data which may include which categories are included of the different category sets identified by their identifiers.

Figure 3:
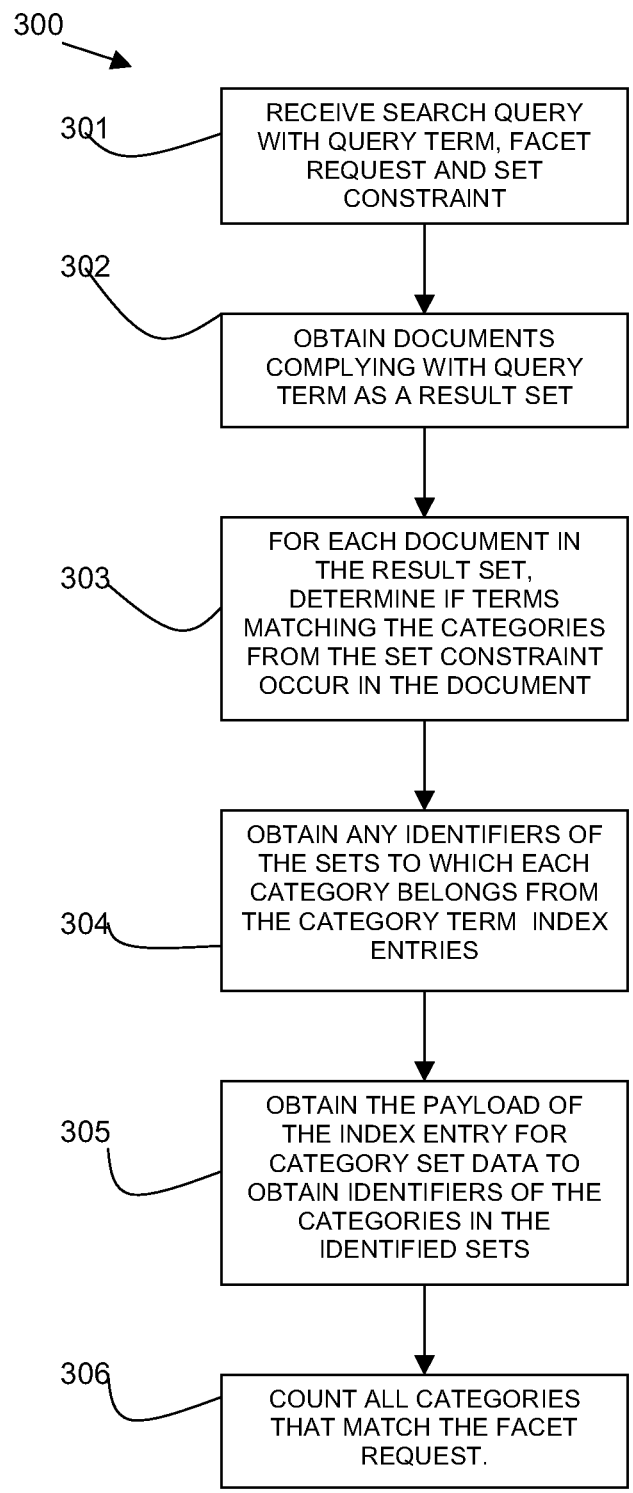
FIG. 3 is a flow diagram of an aspect of a method in accordance with the present invention.

FIG. 3 is a flow diagram 300 showing an example embodiment of a method of searching using the described category sets.

A search query may be received 301 including a query term, a facet request and a set constraint. For example, the set constraint may be a "same set constraint".

The documents which comply with the query may be obtained 302 (the "result set"). For each document in the result set, it may be determined 303 if terms matching the categories from the same set constraint occur in the document. If they do, the list of identifiers of sets to which each category from the set constraint belongs may be obtained 304.

The payload of the index entry for category set data is obtained 305 and deserialized to obtain identifiers of all the categories in the identified sets.

All categories that match the facet request may be counted 306. For example, in the same set constraint, each category in the sets is counted that is: a) not in the set constraint, and b) matches the facet request.

Another example of a set constraint is "one-of-any same set constraint", where the constraint contains a list of categories, and the relevant category sets given a document are the sets which contain at least one category from the set constraint.

A further possible set constraint is "second degree same set constraint". Evaluating this constraint type has two phases. The first phase is identical to the "same set constraint"—identifying all categories which share category sets with the set constraint categories. In the second phase, the categories found in the first phase are used as input, and any category which co-occurs in a category set with those categories is counted (in accordance to the facet request).

Figure 4:
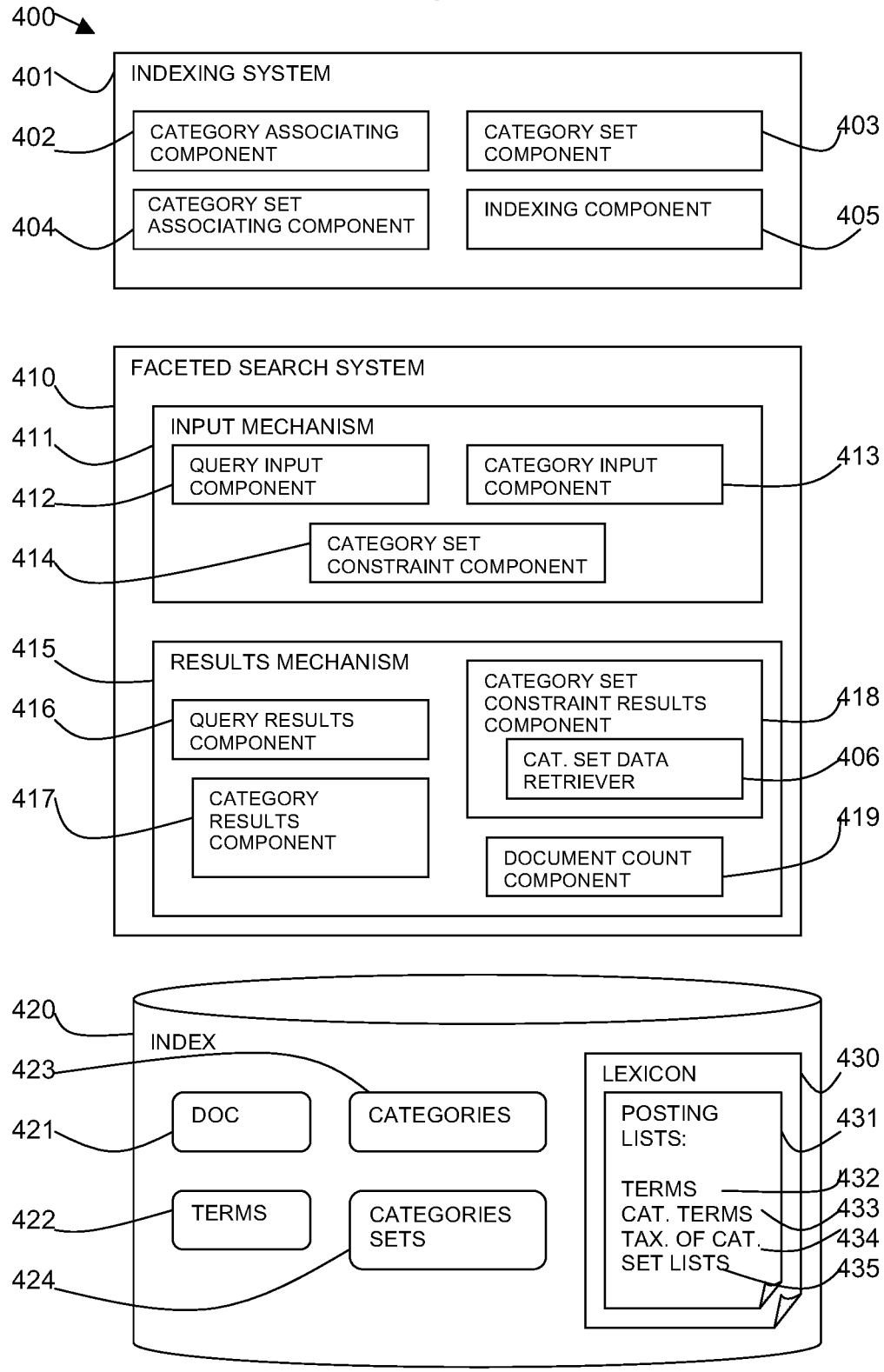
FIG. 4 is a block diagram of a system in accordance with the present invention.

Referring to FIG. 4, a block diagram shows an embodiment of a system 400 for faceted search with related categories defined in category sets.

The system 400 may include an indexing system 401 for indexing a document set of multiple documents in an index 420. The indexing system 401 may include a category associating component 402 for associating categories to a document to which it belongs. The indexing system 401 may also include a category set component 403 for grouping multiple categories associated with a document into a category set based on a relationship between the multiple categories. A category set associating component 404 may be provided for associating the category set with a document. An indexing component 405 may be provided for indexing the category sets in the index 420 for retrieval of documents from categories sharing a category set.

A faceted search system 410 may be provided including an input mechanism 411. The input mechanism 411 may include a query input component 412 for inputting a query term, a category input component 413 for inputting a category or facet request, and a category set constraint component 414 for inputting a set constraint, for example, a same set constraint, one-of-any same set constraint, second degree same set constraint, or any other defined set constraint.

The faceted search system 410 may include a results mechanism 415. The results mechanism 415 may include a query results component 416 for returning results for an input query term. The results mechanism 415 may include a category set constraint results component 418 for applying an input set constraint and including a category set data retriever 406 for retrieving category set data from set lists in an index 420. The results mechanism 415 may also include a category results component 417 for restricting the results to a requested category for a facet request. The results mechanism 415 may include a document count component 419.

The system 400 may also include an index 420 for indexing documents 421 by terms 422, the documents 421 belonging to categories 423 which may be grouped in category sets 424. The index may include a lexicon 430 with posting lists 431 for terms 432, category terms 433. Posting lists 431 may also be provided for a taxonomy of categories 434 and for a category set lists 435.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

An example is now provided to illustrate further the described method and system.

Figure 6A:
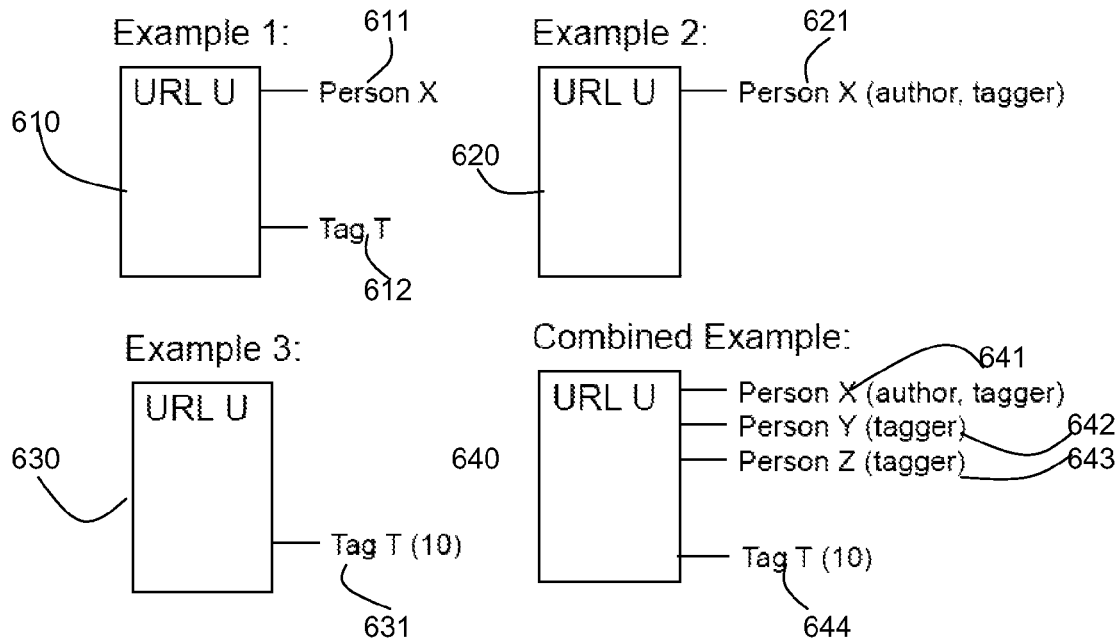
FIGS. 6A and 6B are schematic diagrams showing example category sets in accordance with the present invention.
Figure 6B:
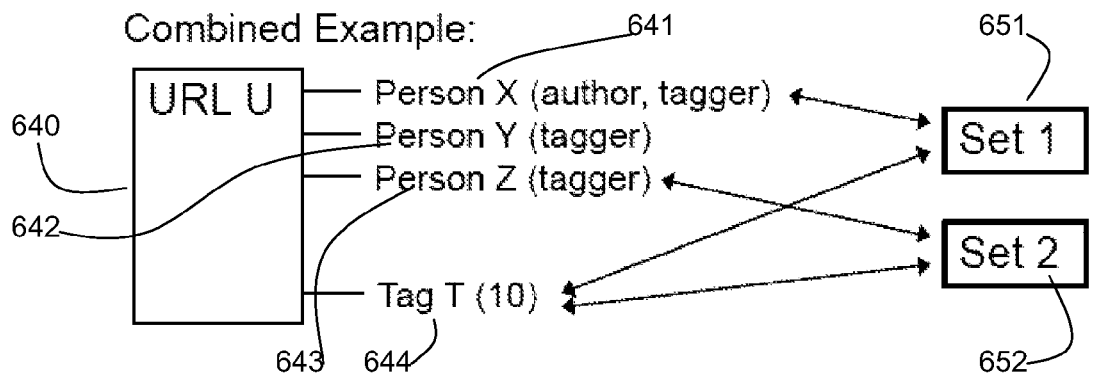

Referring to FIGS. 6A and 6B, schematic diagrams show documents having categories and category sets. In FIG. 6A, example documents 610, 620, 630, 640 are attached with categories. Example 1 document 610 has categories of Person X 611 and Tag T 612. Example 2 document 620 has a category of Person X (author, tagger) 621. Example 3 document 630 has a category of Tag T (10) 631. Combined example document 640 has categories of Person X (author, tagger) 641, Person Y (tagger) 642, Person Z (tagger) 643, and Tag T (10) 644.

In FIG. 6A, part of the relationship is not modeled, namely the fact that Person X used Tag T. In order to maintain this part of the relationship, a new construct is introduced, which binds categories together as category sets. A category set is a grouping of categories attached to a certain document.

In FIG. 6B, the combined example document 640 is shown as having two category sets 651, 652. A first category set 651, "Set 1", includes Person X (author, tagger) 641 and Tag T (10) 644. A second category set 652, "Set 2", includes Person Z (tagger) 643 and Tag T (10) 644.

Figure 7A:
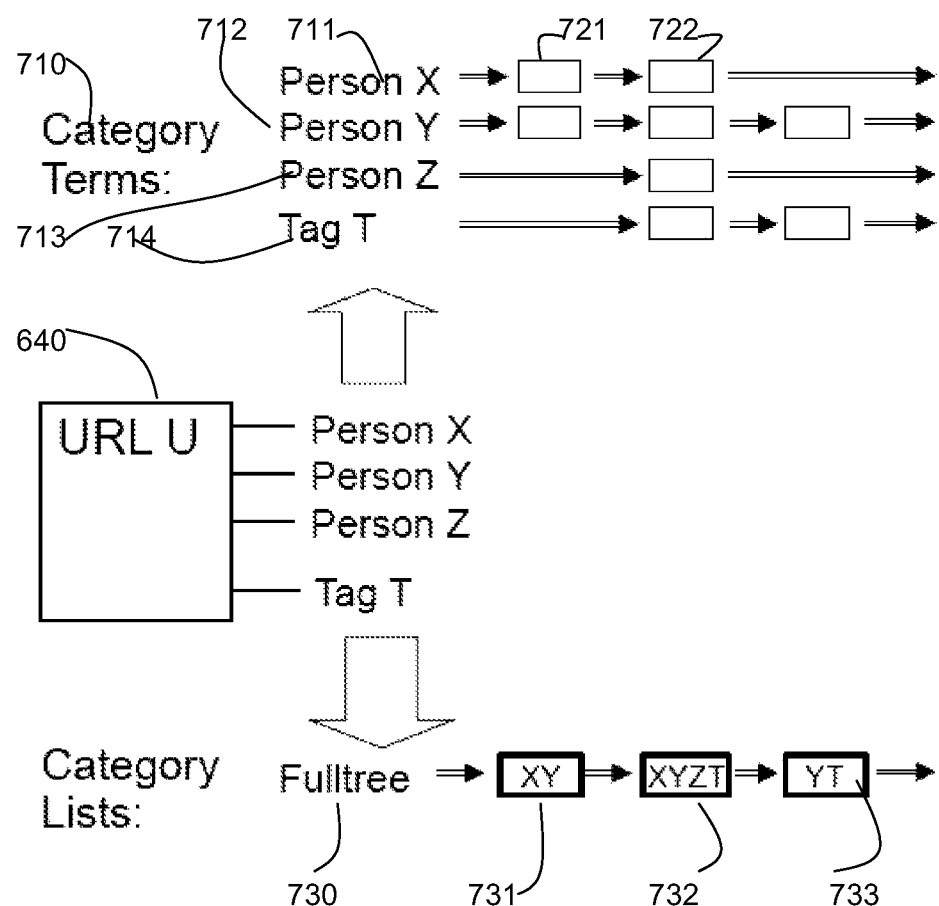
FIGS. 7A and 7B are schematic diagrams showing indexing categories for faceted search and faceted search implementation as known in the prior art.
Figure 7B:
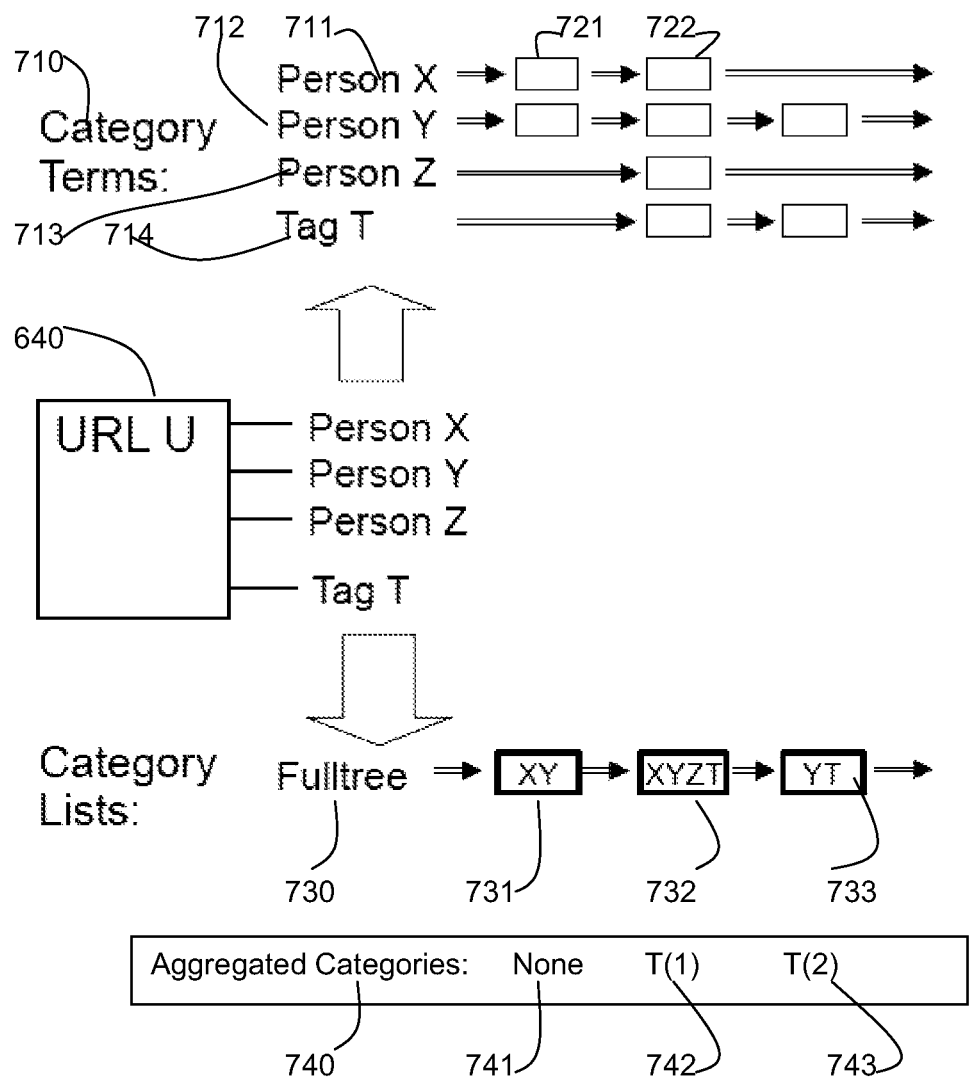

FIGS. 7A and 7B are schematic diagrams showing examples of indexing categories for faceted search and a faceted search implementation as known in the prior art.

Referring to FIG. 7A, the combined example document 640 of FIGS. 6A and 6B is used.

Index entries 711-714 are provided for category terms 710. The index entries 711-714 are posting lists which have a single occurrence 721, 722 for each document to which the category is attached. This allows the limiting of documents in a result set to only those which are attached with a certain category.

In basic facets aggregation, when dealing with a specific document each category is either attached to the document or not. This means that during indexing it is enough to serialize all categories attached to a certain document, and add them as the payload of a designated term (to be denoted "fulltree term"). The fulltree term index entry 730 is a posting list of categories in a taxonomy. The fulltree term index entry 730 includes document occurrences 731-733 with each document occurrence having a payload of serialized categories to which the document belongs. For example, in the case of the combined example document 640, the document occurrence 732 includes a payload of serialized categories of Person X, Person Y, Person Z, and Tag T (XYZT).

Referring to FIG. 7B, the indexed categories are used in a faceted search request. The faceted search request contains two parts: the query which dictates which documents are relevant; and the facet request which dictates which categories are to be counted.

To count to how many documents from the result set (documents which comply with the query) each category is attached to, it is sufficient to go through the posting list of the fulltree term index entry 730, and find the document occurrences 731-733 corresponding to the result set. For each such document occurrence 731-733, the payload is fetched and deserialized to get the document categories. The count of each of these categories which is relevant to the facet request is then incremented, and at the end of the process all categories that match the facet request are associated with the proper count.

In the example shown in FIG. 7B, the facet request is for tags. Therefore, the aggregated categories 740 are counted from the fulltree term index entry 730. The document occurrence 731 has categories Person X and Person Y; therefore no count is added 741. The document occurrence 732 has categories Person X, Person Y, Person Z, and Tag T; therefore a count of T(1) 742 is added. The document occurrence 733 has categories of Person Y and Tag T; therefore the count is incremented to T(2) 743.

Figure 8A:
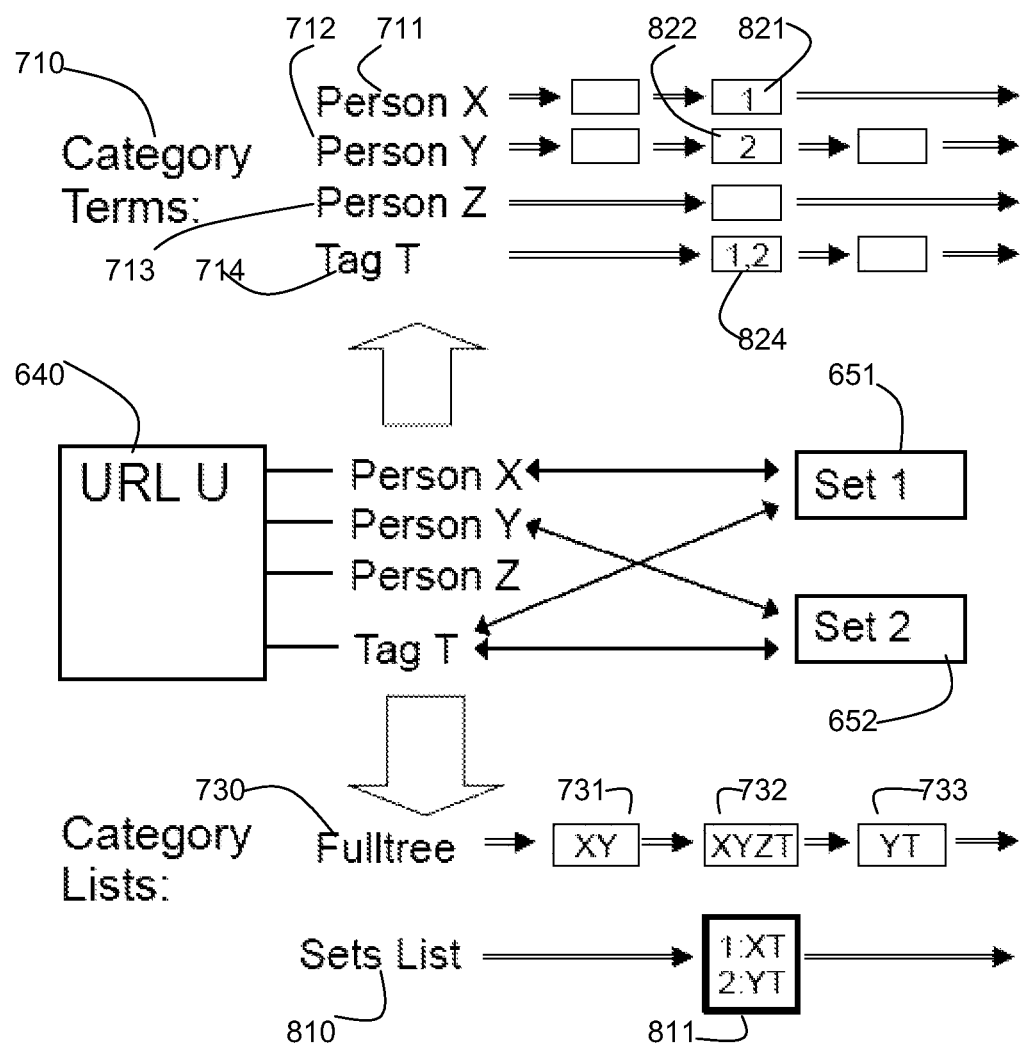
FIGS. 8A and 8B are schematic diagrams showing indexing category sets and search with category sets in accordance with the present invention.
Figure 8B:
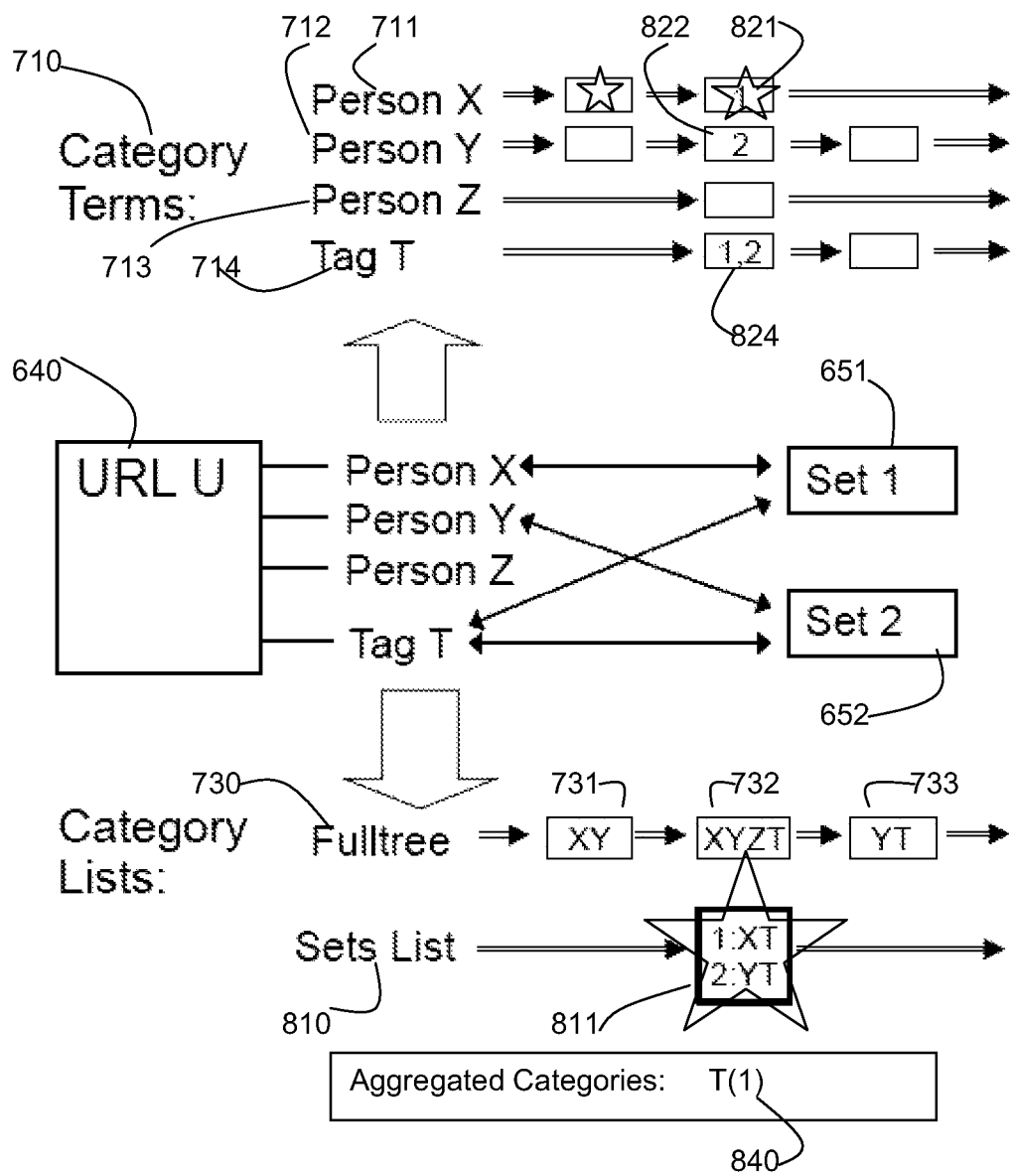

FIGS. 8A and 8B are schematic diagrams showing an example of indexing category sets for faceted search and an example faceted search implementation using category sets as described herein. The examples given in FIGS. 6A, 6B, 7A and 7B are used.

The notion of category sets allows a method for attaching categories to documents, where a set of categories may be attached to a certain document together. This requires, in addition to the fulltree term, a new designated term as an index entry for category sets data 810 (denoted "sets list term").

For a document that is attached with category sets, all categories in the sets may be added in the regular manner, and in addition the following may occur. Each category set may be assigned an ordinal number (in ascending order), or other form of reference. A payload may be added to the category term index entry 711-714 of each category from the set. The payload of each document occurrence 721, 722 may have the category set's ordinal number added to it. If the category belongs to more than one set the payload may include the ordinal numbers of all the sets the category belongs to.

For example, the combined example document 640 has document occurrences 821-824 in each of the category term index entries 711-714 for Person X 711, Person Y 712, Person Z 713, and Tag T 714. The categories of Person X and Tag T belong to Set 1 651 and therefore the ordinal number "1" is added to the document occurrences 821 and 824 for the document in category term index entries 711 and 714 for categories Person X and Tag T respectively. The categories of Person Y and Tag T belong to Set 2 652 and therefore the ordinal number "2" is added to the document occurrences 822 and 824 for the document in category term index entries 712 and 714 for categories Person Y and Tag T respectively.

The index entry for category sets data 810 has a document occurrence 811 for the combined example document 640 and the payload includes a serialization of all the category sets data. In this example, "1:XT" denoting Set 1 651 with categories Person X and Tag T, and "2:YT" denoting Set 2 652 with categories Person Y and Tag T.

Referring to FIG. 8B, with the addition of category sets, a faceted search request may contain a set constraint in addition to the query and facet request. The set constraint may define which sets are relevant. One example for such a constraint is "same set constraint", which is defined by a list of categories that must be contained in the category set. For each set that complies with the constraint, all categories which are not in the list are relevant to the facet request. This captures categories related to the facet request category.

Applying a same set constrained facet request may involve the following steps. Firstly, the documents which comply with the query (the "result set") may be found. For each document in the result set, it may be determined if the terms matching the categories from the same set constraint occur in the document by looking up the document occurrences in the category term index entries 711-714. If they do, the list of ordinals of sets to which each category from the set constraint belongs may be fetched, and the ordinals lists may be intersected. If the intersection is not empty, the payload of the document occurrence of the sets list term 810 in the document may be fetched and deserialized. For each category set in the intersection, the set categories may be obtained. For each category in these sets that is a) not in the set constraint, and b) matches the facet request, the count may be incremented.

At the end of the process all categories that match the facet request and set constraint may be associated with the proper count.

Referring to the example of the combined example document 640, the same set constraint as category Person X is used. The document occurrences 721, 722 in the category term index entry 711 for Person X are retrieved. The document occurrence 722 includes Set 1. From the set list term 810 document occurrence payload, it is determined that Set 1 includes the categories of Person X and Tag T. As Tag T is not in the set constraint and matches the facet request of counting tags, the category of Tag T is aggregated by count T(1) 840.

A system for faceted search with related categories may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for faceted search comprising the steps of:
providing computer instructions to run on a processor, wherein the instructions comprise distinct software modules including a category set component, a category set associating component and an indexing component, the processor operative under control of the instructions to perform the steps of:
invoking the category set component to define category sets in a category collection;
invoking the category set associating component to associate the category sets with respective documents of a document collection, wherein the category sets consist of all categories of the category collection to which the respective documents associated therewith belong;
invoking the indexing component a first time to establish a first inverted index comprising first inverted index entries for respective first categories of the category collection, wherein each of the first inverted index entries comprises a first posting list of the first documents of the document collection that belong to one of the respective first categories;
invoking the indexing component a second time to establish a second inverted index comprising a second inverted index entry for the category sets, the second inverted index entry comprising a second posting list of second documents of the document collection that belong to categories of the category sets;
responsively to a search query having terms and facets, searching the first inverted index entries to obtain a result set of documents complying with the search query, wherein a facet is a portion of elements of a list of categories;
iteratively, for respective categories in the category sets of the documents in the result set, searching the second inverted index entry to determine memberships of the respective categories in other category sets of the category collection;
identifying among the memberships a qualifying group of documents whose associated category sets include a category that matches one of the facets of the search query; and
retrieving at least a portion of the qualifying group of documents.

2. The method according to claim 1, wherein invoking the indexing component a first time comprises associating with the first inverted index entries respective first payloads comprising identifiers of ones of the category sets that include the respective first categories.

3. The method according to claim 1, wherein invoking the indexing component a second time comprises assigning respective identifiers to the category sets.

4. The method according to claim 3, wherein invoking the indexing component a second time comprises associating with the second documents respective second payloads comprising the identifiers of ones of the category sets that include the categories of the category collection to which the second documents belong.

5. The method according to claim 1, wherein invoking the indexing component a first time comprises associating with the first inverted index entries unique textual representations of the respective first categories.

6. A computer software product for faceted search, including a non-transitory computer-readable storage medium in which computer program instructions are stored, which instructions, when executed by a computer, cause the computer to perform the steps of:
defining category sets in a category collection;
associating the category sets with respective documents of a document collection, wherein the category sets consist of all categories of the category collection to which the respective documents associated therewith belong;
establishing a first inverted index comprising first inverted index entries for respective first categories of the category collection, wherein each of the first inverted index entries comprises a first posting list of the first documents of the document collection that belong to one of the respective first categories;

establishing a second inverted index comprising a second inverted index entry for the category sets, the second inverted index entry comprising a second posting list of second documents of the document collection that belong to categories of the category sets;

responsively to a search query having terms and facets, searching the first inverted index entries to obtain a result set of documents complying with the search query, wherein a facet is a portion of elements of a list of categories;

iteratively, for respective categories in the category sets of the documents in the result set, searching the second inverted index entry to determine memberships of the respective categories in other category sets of the category collection;

identifying among the memberships a qualifying group of documents whose associated category sets include a category that matches one of the facets of the search query; and retrieving at least a portion of the qualifying group of documents.

7. The computer software product according to claim 6, wherein establishing a first inverted index comprises associating with the first inverted index entries respective first payloads comprising identifiers of ones of the category sets that include the respective first categories.

8. The computer software product according to claim 6, wherein establishing a second inverted index comprises assigning respective identifiers to the category sets.

9. The computer software product according to claim 8, wherein establishing a second inverted index comprises associating with the second documents respective second payloads comprising the identifiers of ones of the category sets that include the categories of the category collection to which the second documents belong.

10. The computer software product according to claim 6, wherein establishing a first inverted index comprises associating with the first inverted index entries unique textual representations of the respective first categories.

11. A data processing system for faceted search, comprising:
  a processor;
  a memory accessible to the processor storing programs and data objects therein, the programs including a category set component, a category set associating component and an indexing component, wherein execution of the programs cause the processor to perform the steps of:
  invoking the category set component to define category sets in a category collection;
  invoking the category set associating component to associate the category sets with respective documents of a document collection, wherein the category sets consist of all categories of the category collection to which the respective documents associated therewith belong;
  invoking the indexing component a first time to establish a first inverted index comprising first inverted index entries for respective first categories of the category collection, wherein each of the first inverted index entries comprises a first posting list of the first documents of the document collection that belong to one of the respective first categories;
  invoking the indexing component a second time to establish a second inverted index comprising a second inverted index entry for the category sets, the second inverted index entry comprising a second posting list of second documents of the document collection that belong to categories of the category sets;
  responsively to a search query having terms and facets, searching the first inverted index entries to obtain a result set of documents complying with the search query, wherein a facet is a portion of elements of a list of categories;
  iteratively, for respective categories in the category sets of the documents in the result set, searching the second inverted index entry to determine memberships of the respective categories in other category sets of the category collection;
  identifying among the memberships a qualifying group of documents whose associated category sets include a category that matches one of the facets of the search query; and
  retrieving at least a portion of the qualifying group of documents.

12. The data processing system according to claim 11, wherein invoking the indexing component a first time comprises associating with the first inverted index entries respective first payloads comprising identifiers of ones of the category sets that include the respective first categories.

13. The data processing system according to claim 11, wherein invoking the indexing component a second time comprises assigning respective identifiers to the category sets.

14. The data processing system according to claim 13, wherein invoking the indexing component a second time comprises associating with the second documents respective second payloads comprising the identifiers of ones of the category sets that include the categories of the category collection to which the second documents belong.

15. The data processing system according to claim 11, wherein invoking the indexing component a first time comprises associating with the first inverted index entries unique textual representations of the respective first categories.

\* \* \* \* \*